US008959242B1

(12) United States Patent
Barrall

(10) Patent No.: US 8,959,242 B1
(45) Date of Patent: Feb. 17, 2015

(54) METHOD OF REDUCING BANDWIDTH REQUIRED FOR SHARING OF FILES ON A SERVER

(71) Applicant: Connected Data, Inc., San Jose, CA (US)

(72) Inventor: Geoffrey S. Barrall, San Jose, CA (US)

(73) Assignee: Connected Data, Inc., San Jose, CA (US)

( * ) Notice: Subject to any disclaimer, the term of this patent is extended or adjusted under 35 U.S.C. 154(b) by 0 days.

(21) Appl. No.: 14/322,447

(22) Filed: Jul. 2, 2014

(51) Int. Cl.
*G06F 15/16* (2006.01)
*H04L 29/08* (2006.01)

(52) U.S. Cl.
CPC .................................... *H04L 67/06* (2013.01)
USPC ........... 709/231; 709/205; 709/228; 709/219; 707/726

(58) Field of Classification Search
USPC ................... 709/231, 205, 228, 219; 707/726
See application file for complete search history.

(56) References Cited

U.S. PATENT DOCUMENTS

| 6,907,463 | B1* | 6/2005 | Kleinpeter, III et al. ....... 709/228 |
|---|---|---|---|
| 7,047,406 | B2* | 5/2006 | Schleicher et al. ........... 713/168 |
| 8,548,992 | B2* | 10/2013 | Abramoff et al. ............. 707/726 |
| 2002/0138576 | A1* | 9/2002 | Schleicher et al. ........... 709/205 |
| 2002/0138744 | A1* | 9/2002 | Schleicher et al. ........... 713/187 |
| 2012/0110515 | A1* | 5/2012 | Abramoff et al. ............. 715/854 |
| 2014/0074991 | A1* | 3/2014 | Gibson et al. ................. 709/219 |

* cited by examiner

*Primary Examiner* — Tammy Nguyen
(74) *Attorney, Agent, or Firm* — Sunstein Kann Murpgy & Timbers LLP

(57) ABSTRACT

A method is provided of reducing bandwidth required for sharing a selected network-stored folder with a set of target computers so as to cause, on each target computer, storage locally of a mirrored folder that corresponds to the selected folder. The method uses file transfers on a peer-to-peer basis.

10 Claims, 5 Drawing Sheets

METHOD OF REDUCING BANDWIDTH REQUIRED FOR SHARING OF FILES ON A SERVER

TECHNICAL FIELD

The present invention relates to server-based file storage systems, and more particularly to server-based storage systems that are accessed over wide area networks, such as the internet, and used for sharing of folders among different computers.

BACKGROUND ART

Server-based storage systems that are accessed over wide area networks, such as the internet, and used for sharing of folders among different computers are well known. One example of such a server-based storage is offered as a service by Dropbox Inc. of San Francisco, Calif.; see www.dropbox.com.

SUMMARY OF THE EMBODIMENTS

In a first embodiment of the invention there is provided a method of reducing bandwidth required for sharing a selected network-stored folder with a set of target computers so as to cause, on each target computer, storage locally of a mirrored folder that corresponds to the selected folder. In this embodiment, each of the target computers is coupled to a wide area network, wherein the selected folder is stored in a server-based storage system accessible over the wide area network, and the server-based storage system coupled to a server.

In this embodiment, the method includes causing, by the server, each target computer to run a synchronization program that has a synchronization protocol. The protocol is configured in a given one of the target computers (i) to provide, over the wide area network, to the server, folder-change data when a mirrored folder stored locally on the given target computer has experienced a change by virtue of adding, removing, modifying, or moving a file therein and (ii) to interact with the server to cause updating of the selected network-stored folder to reflect the change.

Still in connection with this embodiment, in response to receipt by the server of the folder-change data from the given one of the target computers, the method additionally includes transmitting, by the server, to the synchronization program running on the given one of the target computers, metadata from the server of the server-based storage system characterizing at least one destination IP address of the other target computers to be used for folder synchronization. The protocol is further configured to cause the given target computer to use the at least one destination IP address to cause its mirrored folder to be synchronized with the at least one of the other target computers by file transfer therewith over the wide area network on a peer-to-peer basis. In this manner, any need for transfer by the server of data files from the server-based storage system over the wide area network to the target computers in order to maintain synchronization of the selected folder is reduced.

Optionally, transmitting, by the server, metadata from the server characterizing at least one destination IP address of the other target computers includes transmitting metadata characterizing destination IP addresses of all of the other target computers.

Also optionally, the protocol is further configured to cause the file transfer on a peer-to-peer basis to be accomplished using encryption/decryption processes so each file transferred is encrypted before it is transferred and decrypted after being transferred.

Yet also optionally, the protocol is further configured to cause each of the target computers receiving a file transfer from the given target computer to send to the server a synchronization-complete notification when such target computer's mirrored folder matches the state of the given target computer's mirrored folder.

A related embodiment additionally includes determining by the server whether a synchronization-complete notification has been received from each of the target computers other than the given target computer. A further related embodiment further includes, if it is determined by the server that a synchronization-complete notification has not been received by the server from each of the target computers other than the given target computer, but that a synchronization-complete notification has been received by the server from at least one of the target computers, transmitting, to at least one of the target computers that sent to the server a synchronization-complete notification, metadata characterizing the destination IP address of at least one of the target computers that failed to send to the server a synchronization-complete notification. Optionally, the method further includes if it is determined by the server that a synchronization-complete notification has not been received by the server from any of the target computers, synchronizing the selected network-stored folder with at least one of the other target computers over the wide area network.

Another embodiment operates with a similar structure, in response to a share-folder message to the server from a given target computer to cause sharing, with a set of new target computers coupled to the wide area network, of the selected network-stored folder. This embodiment includes causing each of the new target computers to run the synchronization program and sending, by the server, to the synchronization program running on the given one of the target computers, metadata from the server of the server-based storage system characterizing at least one destination IP address of the new target computers, to be used for folder synchronization. In this embodiment, the protocol is further configured to cause the given target computer to use the at least one destination IP address to cause its mirrored folder to be synchronized with the at least one of the other new target computers by file transfer therewith over the wide area network on a peer-to-peer basis. In this manner, any need for transfer by the server of data files from the server-based storage system over the wide area network to the new target computers in order to maintain synchronization of the selected folder is reduced.

Another embodiment provides a method of reducing bandwidth required for sharing a selected network-stored folder with a set of target computers so as to cause, on each target computer, storage locally of a mirrored folder that corresponds to the selected folder, each of the target computers coupled to a wide area network, wherein the selected folder is stored in a server-based storage system accessible over the wide area network, the server-based storage system coupled to a server. In this embodiment, the method includes running on a given one of the target computers, a synchronization program, obtained from the server, that has a synchronization protocol. The method further includes, in consequence of the synchronization of the protocol, (i) providing over the wide area network, to the server, folder-change data when a mirrored folder stored locally on the given target computer has experienced a change by virtue of adding, removing, modifying, or moving a file therein and (ii) interacting with the server to cause updating of the selected network-stored folder to reflect the change. Lastly, the method of this embodiment includes receiving, by the given one of the target computers, metadata from the server of the server-based storage system characterizing at least one destination IP address of the other target computers to be used for folder synchronization and using by the given one of the target computers the at least one destination IP address to cause its mirrored folder to be synchronized with the at least one of the other target computers by file transfer therewith over the wide area network on a peer-to-peer basis. In this manner, any need for transfer by the server of data files from the server-based storage system over the wide area network to the target computers in order to maintain synchronization of the selected folder is reduced.

Another embodiment provides a non-transitory digital storage medium encoded with instructions that, when loaded into and running in each of a set of target computers, and with each of the target computers coupled to a wide area network, establishes in each target computer a synchronization program. The synchronization program has a synchronization protocol. The protocol is configured to implement a method of reducing bandwidth required for sharing a selected network-stored folder with the set of target computers so as to cause, on each target computer, storage locally of a mirrored folder that corresponds to the selected folder. The selected folder is stored in a server-based storage system accessible over the wide area network, and the server-based storage system is coupled to a server. The protocol is configured in a given one of the target computers (i) to provide, over the wide area network, to the server, folder-change data when a mirrored folder stored locally on the given target computer has experienced a change by virtue of adding, removing, modifying, or moving a file therein; (ii) to interact with the server to cause updating of the selected network-stored folder to reflect the change; and (iii), on receipt, from the server, of a set of IP addresses of other target computers in the set of target computers, to use the set of destination IP addresses to cause its mirrored folder to be synchronized with that of the other target computers by file transfer therewith over the wide area network on a peer-to-peer basis. In this manner any need for transfer by the server of data files from the server-based storage system over the wide area network to the target computers in order to maintain synchronization of the selected folder is reduced.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "set" has at least one member.

A folder is "stored locally" in relation to a target computer when the folder is stored in storage that is directly coupled to the target computer or in storage that is available to the target computer over a local area network.

A "server" includes a server infrastructure.

A "mirrored folder" is a folder that is replicated from a selected folder in another storage location.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Figure 1:
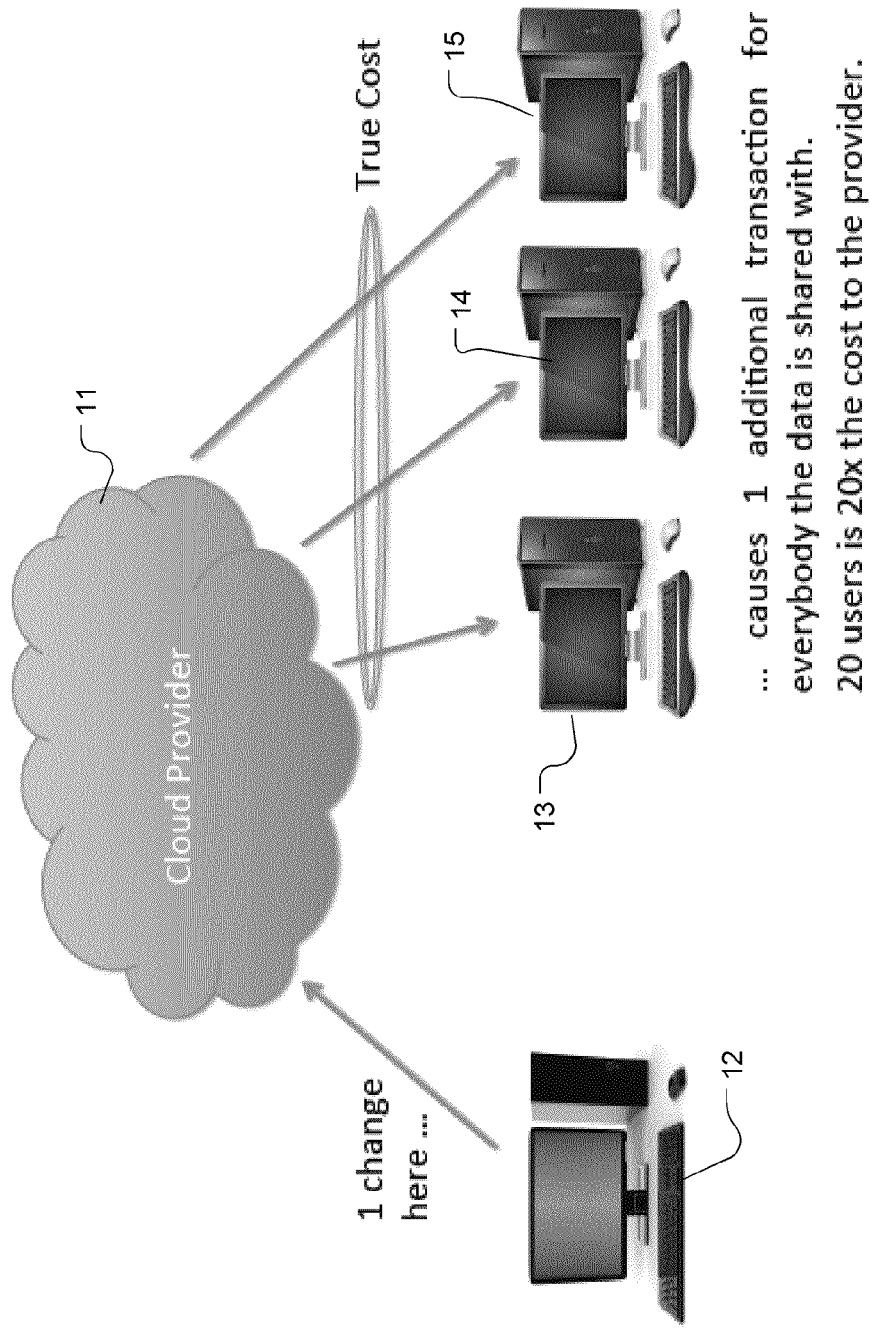
FIG. 1 is a schematic diagram showing a typical cloud storage arrangement as implemented in the prior art.

FIG. 1 is a schematic diagram showing a typical cloud storage arrangement as implemented in the prior art. A server-based file storage system 11 (identified in the figure as "Cloud Provider") is accessed over a wide area network, such as the internet. In this example a user of computer 12 uses the Cloud Provider to store at least one file folder, and choses to share the file folder with computers 13, 14, and 15 of other users. Each time the file folder is shared by the user of computer 12, the Cloud Provider must cause a download from the server over the wide area network to each of the computers 13, 14, and 15 with which the folder is being shared. (The file synchronization among the computers is achieved using a file synchronization program running on each of them.) Consequently if the user of the computer 12 causes a folder to be shared with twenty other users, the Cloud Provider experiences traffic over the wide area network to its server not only for the upload the folder to the server, but also the traffic over the wide area network to download the folder a total of twenty times to computers of each of the twenty other users receiving the shared files. Thus, the Cloud Provider achieves synchronization of a folder among computers sharing the folder by using downloads over the wide area network from its server to do so, once the server has been updated with folder content. Although it is known in the prior art to achieve file synchronization locally over a local area network (LAN), when the sharing computers are coupled over the same subnet of the LAN, the prior art known to the present inventor fails to teach a mechanism for achieving synchronization among computers over a wide area network other than by downloads from the server over the wide area network to do so.

Figure 2:
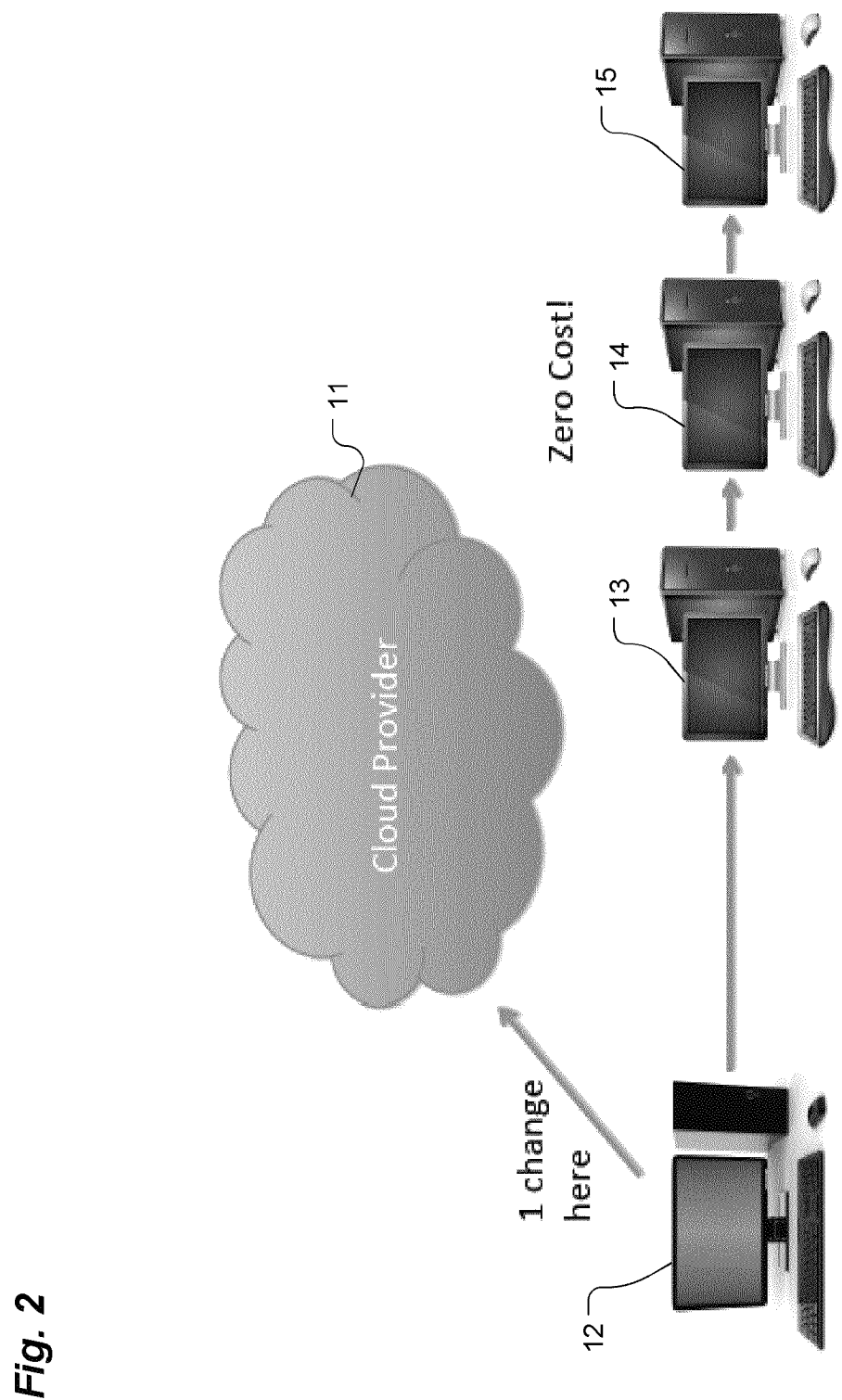
FIG. 2 is a schematic diagram showing cloud storage arrangement as improved by an embodiment of the present invention, employing peer-to-peer file sharing.

FIG. 2 is a schematic diagram showing cloud storage arrangement as improved by an embodiment of the present invention, employing peer-to-peer file sharing. In the embodiment of FIG. 2, the user of computer 12 still uploads the file folder over the wide area network 12 to the Cloud Provider 11, just as in FIG. 1. However, the scenario is changed when the user of computer 12 wishes to share a folder with computers of other users. When the user of computer 12 invokes a file-sharing functionality in the context of the present invention, the file synchronization programs running in computers 12, 13, 14, and 15 operate differently from the programs that are used in the embodiment of FIG. 1, in that they include an extra layer of functionality to implement file sharing on a peer-to-peer basis. In other words, when the user of computer 12 instructs the server of Cloud Provider 11 that computers 13, 14, and 15 of other users are to get copies of a selected folder that the user of computer 12 has placed in storage in the wide-area-network accessible storage system of Cloud Provider 11, there is not an automatic download of the selected network-stored folder from storage of the Cloud Provider 11. Instead, the file synchronization program running on computer 12 is invoked to transfer the folder to the other computers 13, 14, and 15 on a peer-to-peer basis. If the peer-to-peer file transfer is successful, then the only substantive data traffic with the Cloud Provider will have been the initial upload of the folder from the computer 12; thereafter, the remaining traffic will be on a peer-to-peer basis. (There will, however, be relatively minor traffic in metadata to assure that the file transfers have been made.)

Figure 3:
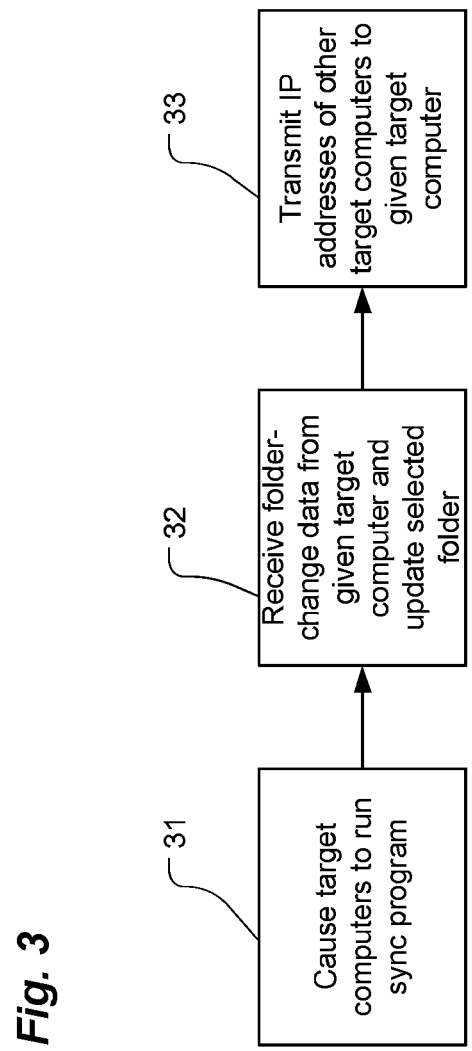
FIG. 3 is a block diagram showing logical flow carried out by a server in accordance with an embodiment of the present invention.

FIG. 3 is a block diagram showing logical flow carried out by a server in accordance with an embodiment of the present invention. We turn next to a case where a selected file in cloud storage (that is, on a server accessed over a wide area network) is to be shared among a set of target computers. The goal is that the selected folder in cloud storage is replicated in a mirrored folder in each of the target computers. Let us assume that that a mirrored folder in a given one of the target computers has been changed—for example, at least one file was added to or modified in the folder. (The folder might equally have been changed by moving or removing one or more files.)

In this example, the server has caused, in process 31, each of the computers to be running a synchronization program. The synchronization program implements a protocol. Specifically, when a mirrored folder stored locally on the given target computer has experienced a change by virtue of adding, removing, modifying, or moving a file therein the protocol is configured to provide, over the wide area network, to the server, folder-change data so the server metadata can track status of the mirrored folders. Additionally, the protocol interacts with the server to cause updating of the selected network-stored folder to reflect the change occurring in the mirrored folder. These processes of the protocol as experienced by the server are shown as process 32 of FIG. 3.

By the end of process 32, the selected network-stored folder has been updated by the given target computer, but the other target computers have not yet been synchronized with the updated selected network-stored folder. At this point, the server transmits metadata over the wide area network to the given target computer that experienced the change in its mirrored folder. The server's metadata includes the IP address of each of the other target computers, and, in process 33, the server transmits to the given target computer the IP addresses of each of the other target computers. Then the protocol implemented by the synchronization program running in the given target computer causes the given target computer to synchronize its mirrored folder, on a peer-to-peer basis, with each of the other mirrored folders in each of the target computers specified by the IP addresses in the metadata obtained from the server. In this manner, the server avoids having to send substantive data over the wide area network to the target computers.

For implementation of peer-to-peer synchronization, see, for example, published United States patent application having publication number US2013/0290256, for an invention of which I am a co-inventor. That application is hereby incorporated herein in its entirety. Although the synchronization can be implemented by sending all of the IP addresses to the given target computer, it is within the scope of the present invention, for example, for the server to send a proper subset of the IP addresses to the given target computer, and then, after a another target computer has been synchronized with the given target computer, the newly synchronized computer can be given a disjoint set of the IP addresses, so the synchronization load can be divided among a plurality of the target computers.

Figure 4:
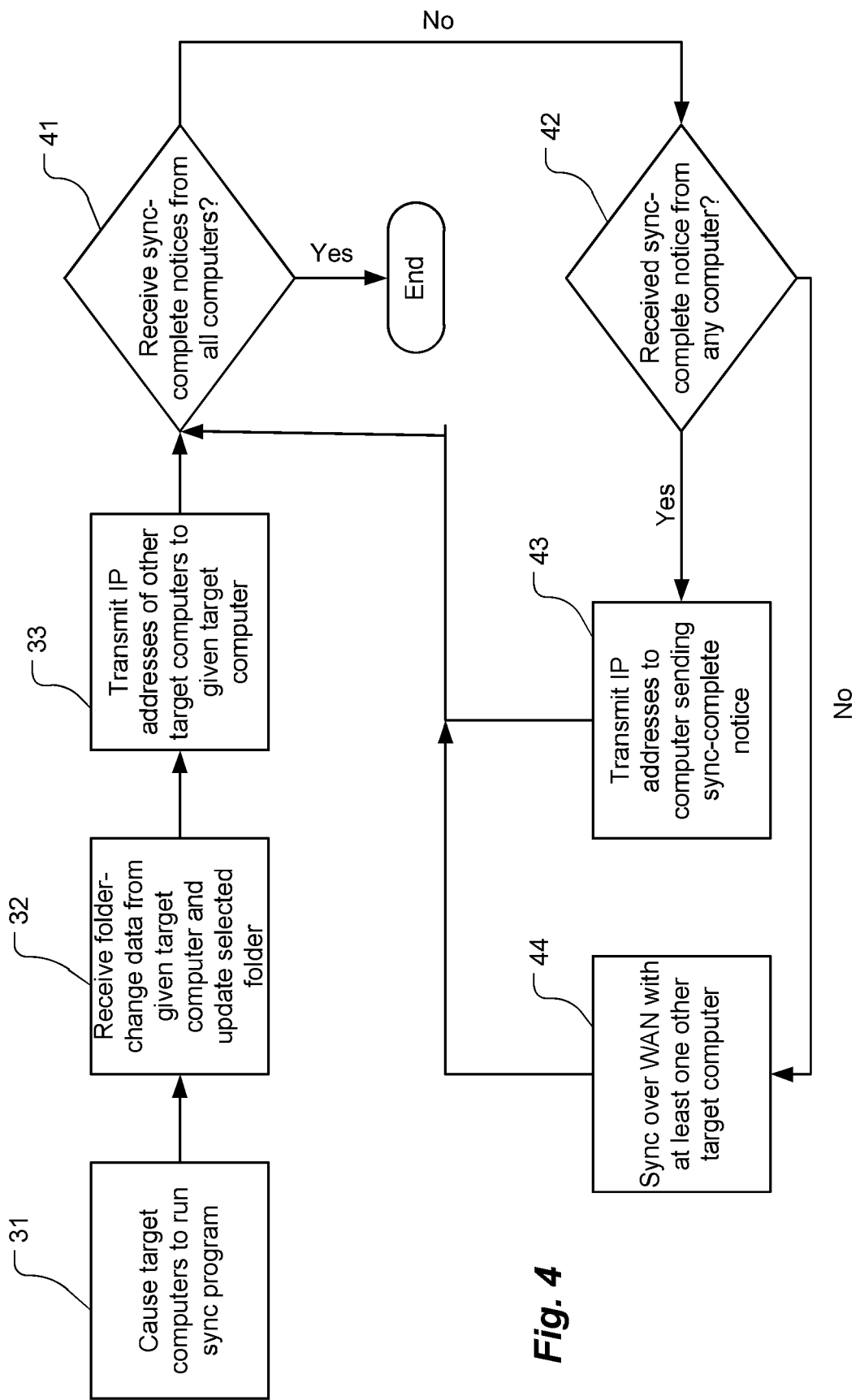
FIG. 4 is a block diagram showing logical flow carried out by a server in accordance with a further embodiment of the present invention.

FIG. 4 is a block diagram showing logical flow carried out by a server in accordance with a further embodiment of the present invention. The embodiment of FIG. 4 is similar to that of FIG. 3, but FIG. 4 includes some additional processes to assure that all of the target computers have been synchronized. In this embodiment, as part of the protocol implemented by the synchronization program, each target computer sends the server a notification when it has completed synchronization. At decision block 41, the server reaches a conditional branch depending on whether it has received sync-complete notifications from all target computers to be synchronized. If the answer is in the affirmative, then processing stops. However, if the answer is in the negative, then the server has another conditional branch at item 42, depending on whether the server has received a sync-complete notification from any target computer to be synchronized. If the answer is in the affirmative, then in process 43, the server passes a set of IP addresses to a target computer that had indeed sent the server a sync-complete notification, and the protocol causes the receiving target computer to synchronize with those computers identified by the IP addresses sent by the server. On the other hand, if the answer to the condition at item 42 is in the negative, then in process 44, the server synchronizes over the wide area network with at least one other target computer. After either process 44 or 43, there is continued branching in process 41 again, depending on whether the server has obtained sync-complete notifications from all of the other target computers.

A similar set of processes are invoked when a new target computer is added to the set of target computers that are to share the selected network-stored folder. The new target computers are caused to run the synchronization program and received the folder by peer-to-peer file transfer when such transfer is available.

Figure 5:
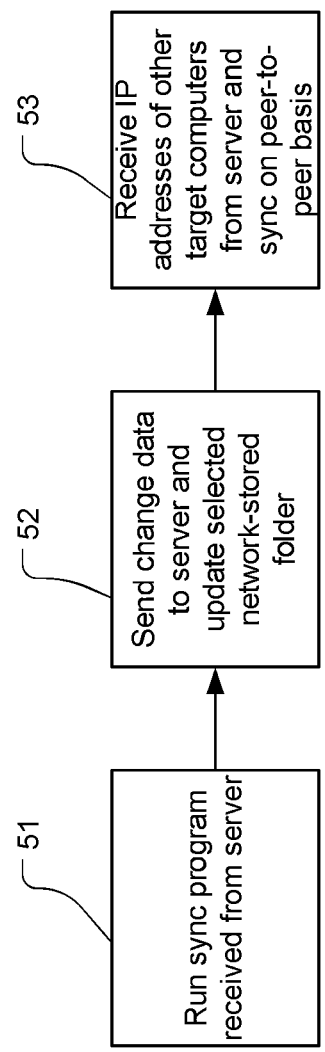
FIG. 5 is a block diagram, of the embodiment of FIG. 3, this time showing logical flow carried out by the given target computer instead of by the server.

FIG. 5 is a block diagram, of the embodiment of FIG. 3, this time showing logical flow carried out by the given target computer instead of by the server. We again assume that that a mirrored folder in the given one of the target computers has been changed—for example, at least one file was added to or modified in the folder. In this example, the given target computer has been caused by the server to run, in process 51, a synchronization program, just as the server has caused the other target computers to run the synchronization program.

In process 52, as a consequence of the synchronization program, the given target computer sends change data to the server and updates the selected network-stored folder.

In process 53, in order for the other target computers to be synchronized with the updated selected network-stored folder, the given computer receives metadata, from the server over the wide area network. The server's metadata includes the IP address of each of the other target computers. Also in process 53, the protocol implemented by the synchronization program running in the given target computer causes the given target computer to synchronize its mirrored folder, on a peer-to-peer basis, with each of the other mirrored folders in each of the target computers specified by the IP addresses in the metadata obtained from the server. As previously mentioned, the server avoids having to send sub-stantive data over the wide area network to the target computers. To handle the eventuality that the given target computer is not successful in achieving synchronization with all of the other target computers, then a set of processes as described in connection with FIG. 4 can be used by the server to backstop this process.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of reducing bandwidth required for sharing a selected network-stored folder with a set of target computers so as to cause, on each target computer, storage locally of a mirrored folder that corresponds to the selected folder, each of the target computers coupled to a wide area network, wherein the selected folder is stored in a server-based storage system accessible over the wide area network, the server-based storage system coupled to a server, the method comprising:

causing, by the server, each target computer to run a synchronization program that has a synchronization protocol, the protocol configured in a given one of the target computers (i) to provide, over the wide area network, to the server, folder-change data when a mirrored folder stored locally on the given target computer has experienced a change by virtue of adding, removing, modifying, or moving a file therein and (ii) to interact with the server to cause updating of the selected network-stored folder to reflect the change;

in response to receipt by the server of the folder-change data from the given one of the target computers, transmitting, by the server, to the synchronization program running on the given one of the target computers, metadata from the server of the server-based storage system characterizing at least one destination IP address of the other target computers to be used for folder synchronization;

wherein the protocol is further configured to cause the given target computer to use the at least one destination IP address to cause its mirrored folder to be synchronized with the at least one of the other target computers by file transfer therewith over the wide area network on a peer-to-peer basis;

so that any need for transfer by the server of data files from the server-based storage system over the wide area network to the target computers in order to maintain synchronization of the selected folder is reduced.

2. A method according to claim 1, wherein transmitting, by the server, metadata from the server characterizing at least one destination IP address of the other target computers, includes transmitting metadata characterizing destination IP addresses of all of the other target computers.

3. A method according to claim 1, wherein the protocol is further configured to cause the file transfer on a peer-to-peer basis to be accomplished using encryption/decryption processes so each file transferred is encrypted before it is transferred and decrypted after being transferred.

4. A method according to claim 1, wherein the protocol is further configured to cause each of the target computers receiving a file transfer from the given target computer to send to the server a synchronization-complete notification when such target computer's mirrored folder matches the state of the given target computer's mirrored folder.

5. A method according to claim 4, further comprising, determining by the server whether a synchronization-complete notification has been received from each of the target computers other than the given target computer.

6. A method according to claim 5, the method further comprising, if it is determined by the server that a synchronization-complete notification has not been received by the server from each of the target computers other than the given target computer, but that a synchronization-complete notification has been received by the server from at least one of the target computers, transmitting, to at least one of the target computers that sent to the server a synchronization-complete notification, metadata characterizing the destination IP address of at least one of the target computers that failed to send to the server a synchronization-complete notification.

7. A method according to claim 6, the method further comprising, if it is determined by the server that a synchronization-complete notification has not been received by the server from any of the target computers, synchronizing the selected network-stored folder with at least one of the other target computers over the wide area network.

8. A method of reducing bandwidth required for sharing a selected network-stored folder with a set of target computers so as to cause, on each target computer, storage locally of a mirrored folder that corresponds to the selected folder, each of the target computers coupled to a wide area network, wherein the selected folder is stored in a server-based storage system accessible over the wide area network, the server-based storage system coupled to a server, the method comprising:

causing, by the server, each target computer to run a synchronization program that has a synchronization protocol, the protocol configured (i) to provide, over the wide area network, to the server, folder-change data when the mirrored folder stored locally has experienced a change by virtue of adding, removing, modifying, or moving a file therein and (ii) to interact with the server to cause updating of the selected network-stored folder to reflect the change;

in response to a share-folder message to the server from a given target computer to cause sharing, with a set of new target computers coupled to the wide area network, of the selected network-stored folder, causing each of the new target computers to run the synchronization program and sending, by the server, to the synchronization program running on the given one of the target computers, metadata from the server of the server-based storage system characterizing at least one destination IP address of the new target computers, to be used for folder synchronization;

wherein the protocol is further configured to cause the given target computer to use the at least one destination IP address to cause its mirrored folder to be synchronized with the at least one of the other new target computers by file transfer therewith over the wide area network on a peer-to-peer basis;

so that any need for transfer by the server of data files from the server-based storage system over the wide area network to the new target computers in order to maintain synchronization of the selected folder is reduced.

9. A method of reducing bandwidth required for sharing a selected network-stored folder with a set of target computers so as to cause, on each target computer, storage locally of a mirrored folder that corresponds to the selected folder, each of the target computers coupled to a wide area network, wherein the selected folder is stored in a server-based storage system accessible over the wide area network, the server-based storage system coupled to a server, the method comprising:

running on a given one of the target computers, a synchronization program, obtained from the server, that has a synchronization protocol, in consequence of the synchronization of the protocol, (i) providing over the wide area network, to the server, folder-change data when a mirrored folder stored locally on the given target computer has experienced a change by virtue of adding, removing, modifying, or moving a file therein and (ii) interacting with the server to cause updating of the selected network-stored folder to reflect the change;

receiving, by the given one of the target computers, metadata from the server of the server-based storage system characterizing at least one destination IP address of the other target computers to be used for folder synchronization and using by the given one of the target computers the at least one destination IP address to cause its mirrored folder to be synchronized with the at least one of the other target computers by file transfer therewith over the wide area network on a peer-to-peer basis;

so that any need for transfer by the server of data files from the server-based storage system over the wide area network to the target computers in order to maintain synchronization of the selected folder is reduced.

10. A non-transitory digital storage medium encoded with instructions that, when loaded into and running in each of a set of target computers, each of the target computers being coupled to a wide area network, establishes in each target computer a synchronization program, the synchronization program having a synchronization protocol, wherein the protocol is configured to implement a method of reducing bandwidth required for sharing a selected network-stored folder with the set of target computers so as to cause, on each target computer, storage locally of a mirrored folder that corresponds to the selected folder, wherein the selected folder is stored in a server-based storage system accessible over the wide area network, the server-based storage system coupled to a server, the protocol configured in a given one of the target computers (i) to provide, over the wide area network, to the server, folder-change data when a mirrored folder stored locally on the given target computer has experienced a change by virtue of adding, removing, modifying, or moving a file therein; (ii) to interact with the server to cause updating of the selected network-stored folder to reflect the change; and (iii), on receipt, from the server, of a set of IP addresses of other target computers in the set of target computers, to use the set of destination IP addresses to cause its mirrored folder to be synchronized with that of the other target computers by file transfer therewith over the wide area network on a peer-to-peer basis; so that any need for transfer by the server of data files from the server-based storage system over the wide area network to the target computers in order to maintain synchronization of the selected folder is reduced.

* * * * *